Patented Nov. 14, 1944

2,362,515

UNITED STATES PATENT OFFICE 2,362,515

SLUICING DEVICE FOR CORPUSCULAR RAY APPARATUS

Franz Weigend, Berlin-Spandau, Germany; vested in the Alien Property Custodian

Application July 30, 1940, Serial No. 348,524
In Germany July 13, 1939

10 Claims. (Cl. 250—49.5)

This invention relates to sluicing devices for corpuscular ray apparatus.

When operating corpuscular ray apparatus such as oscillagraphs or, particularly, electronic microscopes, it is necessary to bring bodies, for instance object to be tested or diaphragms, into and out of the vacuum chamber without impairing the vacuum. It is known to provide for this purpose a sluicing device which contains a revolvable cock plug in a cock casing extending through the vacuum vessel of the apparatus. The cock plug is provided with a transversal bore which serves as a sluicing chamber and, when in proper operating position, forms a passage for the corpuscular ray. When the cock plug is turned into the sluicing position, its transversal bore establishes a communication with a bore of the cock casing extending outwardly so as to permit placing an object or the like into or out of the plug bore. This prior sluicing device does not lend itself readily to such electronic microscopes or other corpuscular ray apparatus which serve for the observation of surfaces.

An object of the invention is to provide a sluicing device for corpuscular ray apparatus whose construction differs from that described above in such manner as to be suitable for electronic microscopes for surface observations. Another object of the invention is to provide means which permit moving the object bodies out of the sluicing chamber into the desired operating position after the sluicing chamber has been charged with the object and brought into communication with the vacuum chamber, this object of the invention relating to microscopes for surface studies as well as to corpuscular ray apparatus in which the rays pass through the object bodies. Other objects of the invention will be apparent from the following.

According to the invention the revolvable member or cock plug of a sluicing device for corpuscular ray apparatus, is provided with a transversal bore which is closed at one end and serves as a sluicing chamber. The object arranged, for instance, on an object cartridge, is introduced into this bore and brought into communication with the vacuum chamber by rotating the cock. In this sluicing device the electron rays do not pass through the bore for the reception of the object or object-holding sluice as is the case with the prior sluicing device mentioned above. The cartridge according to the invention contains a mechanism which permits shifting the object holder out of the sluice bore into the path of the corpuscular rays. In one embodiment of the invention, i. e. in a microscope for surface studies, the object when thus shifted out of the sluice bore is exposed to electron rays which enter the microscope substantially perpendicularly to the optical axis of its electron-optical magnifying system and when striking the object are reflected by the latter into the system.

According to another feature of the invention, the sluicing device is preferably so designed that, after the insertion of the object cartridge, the cock plug is brought into the position in which the sluicing chamber communicates with the vacuum chamber, by rotating the plug 180°. To move the object cartridge from the position thus obtained into the operating position where the object proper lies outside of the sluice chamber, a drive is preferably employed which is arranged in the cock plug and is actuated exteriorly of the vacuum chamber. To this end, according to a further feature of the invention the object cartridge is inserted in a sleeve which in turn is slidably arranged in the bore closed at one end. The sleeve itself is actuated according to a preferred embodiment of the invention by means of a shaft provided with a sealing cone. In order to ensure an adjustment of the object cartridge in both directions of movement relative to the axis of the sluice chamber, it is preferable to effect a drive with the aid of gears and gear racks. A particularly simple device easy to operate is obtained, for instance, if the driving device for moving the object cartridge into the cock bore of the sluicing device is so arranged that the axis of the driving shaft coincides with the axis of the cock plug. In this case the manuals for revolving the sluice chamber and for shifting the object cartridge can be actuated from one point.

According to another modification of the invention, the above-described drive for shifting the object cartridge is also of advantage if the sluicing device is designed in such a manner that the beam of corpuscular rays passes in the operating position through the bore for the reception of the object cartridge, for also in this case the object cartridge may be displaced without jamming. If the sluice, in particular the guide sleeve of the object cartridge, is water-cooled, a driving device of the above-described design has the advantage of an improved exchange of heat since the object cartridge may be brought nearer to the heat exchange surfaces than has hitherto been possible.

The above-mentioned objects and features of the invention will be more fully understood from the following description of the embodiment exemplified in the accompanying drawings showing a sluicing device designed in accordance with the invention for an electronic microscope serving to observe surfaces of objects.

Figure 3:
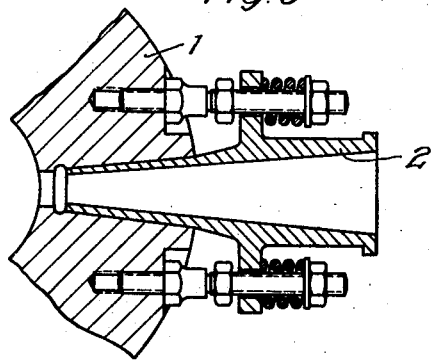
Fig. 3 is a sectional view on the line A—B of Fig. 1.

Referring to the drawings, 1 denotes the casing or fixed member of the object sluicing device and forms also a wall portion of the electron-optical vacuum apparatus proper. In this casing is fitted a neck portion 2 provided by means of a sealing cone engagement. This neck portion 2 (Figs. 1 and 3) connects the vacuum chamber of casing 1 with the microscope section containing the electron-emitting cathode (not shown). The casing 1 is connected with the structure of the objective lens 3 of the electronic microscope. The axis of this lens is perpendicular to the axis of the part 2. The lens structure (Fig. 1) comprises an energizing magnet coil 30, an enclosure 37 of magnetizable metal, a magnetizable body 31, and a pole structure composed of magnetizable pole pieces 33 and 34 and an intermediate non-magnetic section 35. The pole structure forms a central passage for the electron beam and has lateral bores 36 which facilitate evacuating the apparatus. The magnetic circuit of the lens structure extends from pole piece 34 through the parts 31, 37 and 1 to the other pole piece 33 and, when the coil 30 is energized, establishes a magnetic lens field in the gap between the two pole pieces. The lower end 4 of the lens structure is provided with a sealing cone 5 which fits in a corresponding wall portion (not shown) of another section of the electronic microscope containing the screen onto which a magnified image of the object surface is to be projected. 6 is the object to be studied and 7 the cartridge-shaped holder of the object. The electron beam passes through the part 2 in the direction indicated by the arrow 8 and is reflected from the surface of the object 6 so that it enters the objective lens in the direction indicated by the arrow 9.

Figure 1:
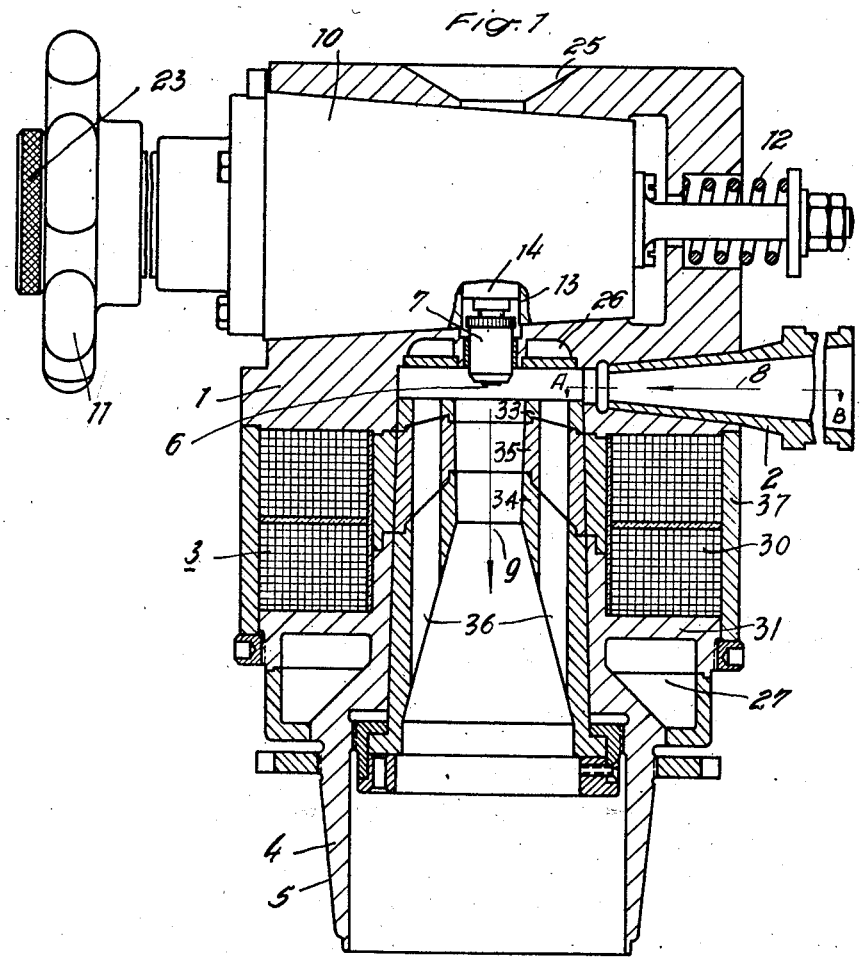
Fig. 1 is a cross-sectional view of the sluicing device.
Figure 4:
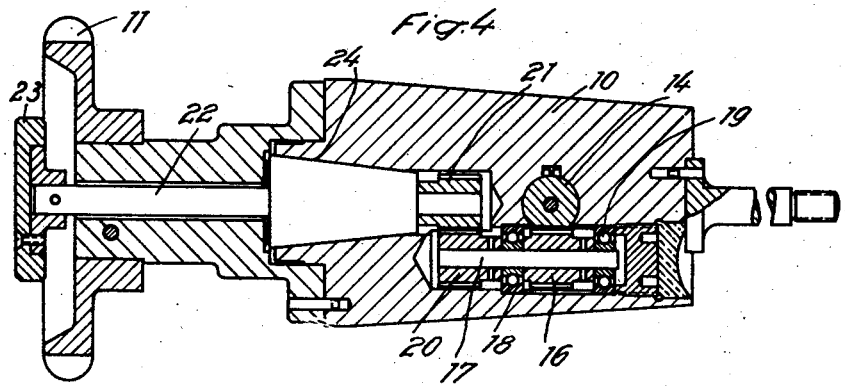
Figs. 4 and 5 are two different longitudinal sectional views of the sluice cock with its inner parts.
Figure 5:
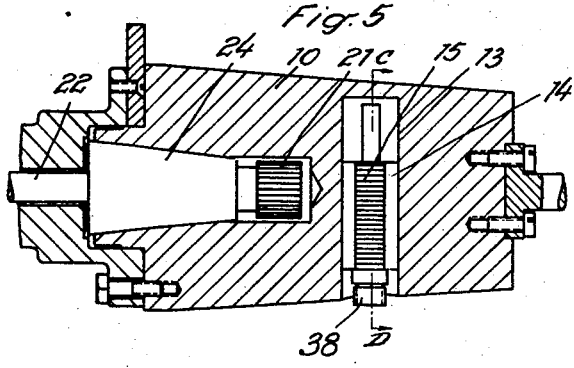
Figure 6:
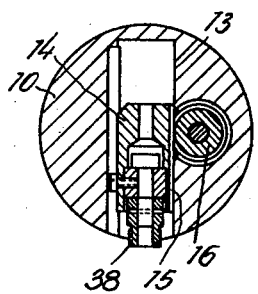
Fig. 6 is a cross-sectional view taken along the line C—D of Fig. 5.

The member 1 forming the stationary portion of the sluicing device contains a revolvable sluice member 10 which, in the embodiment illustrated, is designed as a conical cock plug. The plug 10 may be rotated with the aid of a hand wheel 11 and is firmly held in position by a spring 12. In the plug is provided a bore 13 (Figs. 1, 5, 6) which is closed at one end. This bore 13 forms the sluicing chamber proper. It contains an axially displaceable sleeve 14 having a threaded end portion 38 (Figs. 5 and 6) onto which the correspondingly threaded object cartridge 7 is to be screwed (Fig. 1). For displacing the sleeve 14 in the bore 13, the sleeve 14 is provided with a rack 15 cooperating with a pinion 16. The pinion 16 is mounted on a shaft 17 arranged in the cock plug in parallel relation to the plug axis and mounted in two ball bearings 18 and 19 (Fig. 4). On the left-hand end of the shaft 17 is mounted a gear 20 meshing with a second gear 21 which in turn may be rotated by means of a driving shaft 22 to be actuated exteriorly of the vacuum chamber. The adjustment is effected by the hand wheel 23. To seal the driving shaft 22, a sealing cone 24 is employed which is integral with the shaft 22.

To insert an object cartridge, the plug 10 is so adjusted by means of a hand-operated wheel 11 that the opening of bore 13 is in registry with the sluice opening 25 in body 1 (Fig. 1) for introducing the object. In this position the cartridge 7 is screwed on the threaded end 38 of sleeve 14. The cartridge 7 is then within the bore 13 so that the wheel 11 may be rotated 180° to bring the plug 10 into the position shown in Fig. 1, in which the axis of the bore 13 coincides with the axis of the objective lens 3. The object cartridge 7 is moved out of the bore 13 in the downward direction together with the sleeve 14 by rotating the hand-operated wheel 23 until the object assumes the operating position shown in Fig. 1.

Figure 2:
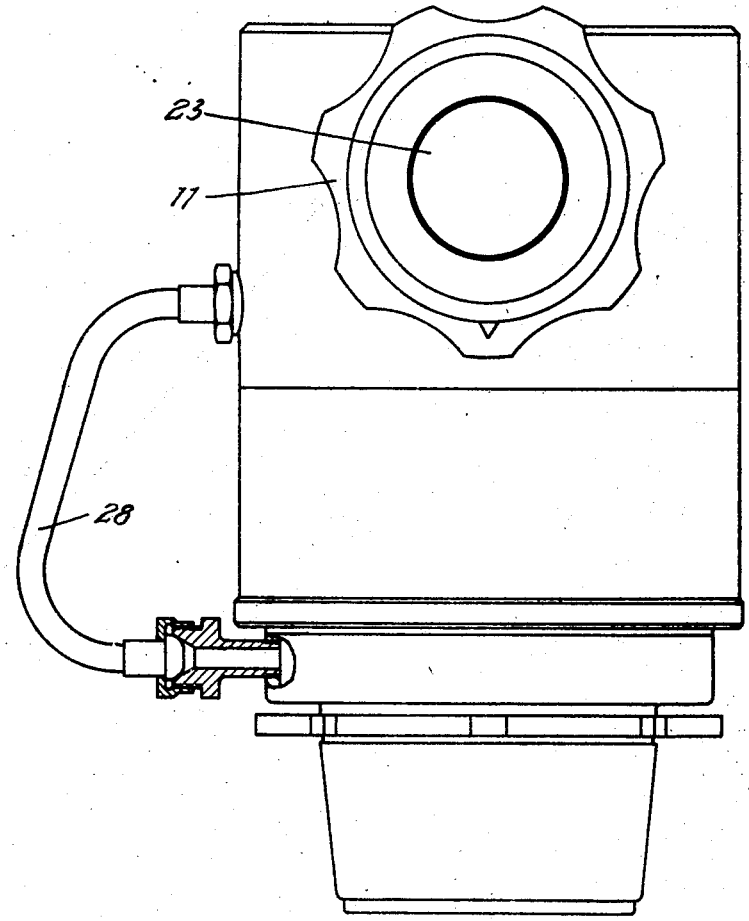
Fig. 2 is a side elevational view thereof.

26 and 27 (Fig. 1) denote cooling ducts and 28 (Fig. 2) a connecting conduit for passing cooling water through the ducts 26 and 27 during the operation of the microscope. The arrangement is preferably so designed that the object cartridge may be shifted within the sleeve in parallel relation to its axis, in order to compensate for the changes in position of the cartridges due to the wear of the plug.

What is claimed is:

1. In a corpuscular ray apparatus having a vacuum chamber and a sluicing device for introducing a body from outside into said chamber, said sluicing device comprising a sluice casing connected with said vacuum chamber and having a sluice opening accessible from outside, a sluice member movably disposed in said casing and having a sluice chamber disposed so as to register with said sluice opening in one position of said movable member and with said vacuum chamber in another position of said movable member, said sluice member and chamber being disposed so as to have the path of the corpuscular rays outside of said chamber in both said positions, carrier means in said sluice chamber for holding said body, said means being displaceable in the direction towards said ray path, and exteriorly actuable drive means arranged in said movable sluice member and engaging said holding means for moving said body out of said sluice chamber towards and into said ray path.

2. In a corpuscular ray apparatus having a vacuum chamber and a sluicing device for introducing a body from outside into said chamber, said sluicing device comprising a sluice casing connected with said vacuum chamber and having a conical bore and a lateral sluice opening passing from said conical bore to the outside, a conical sluice member revolvably disposed in said conical bore, said bore and said revolvable sluice member being arranged so as to have the path of the corpuscular rays outside of said bore in all positions of revolution of said member, said member having a sluice chamber disposed so as to register with said sluice opening in one position of said revolvable member and with said vacuum chamber in another position of said revolvable member, means in said sluice chamber for holding said body, said means being displaceable in the direction towards said ray path, and exteriorly actuable drive means arranged in said sluice member and engaging said holding means for moving said body out of said sluice chamber towards and into said ray path.

3. In a corpuscular ray apparatus having a vacuum chamber and a sluicing device for introducing a body from outside into said chamber, said sluicing device comprising a sluice casing connected with said vacuum chamber and having a conical bore and a lateral sluice opening passing from said conical bore to the outside, said casing being arranged so as to have said bore located away from the path of the corpuscular rays, a movable sluice member forming a conical cock plug and being revolvably disposed in said conical bore, said sluice member being provided with a substantially radial bore having one end closed and the other end registering with said sluice opening in one position of said member and with said vacuum chamber in another position of said member, means in said radial bore for holding said body, said means being displaceable in the axial direction of said radial bore, and exteriorly actuable drive means disposed in said member and engaging said holding means for moving said body out of said bore towards the interior of said vacuum chamber when said bore opening is in registry with said vacuum chamber.

4. In a corpuscular ray apparatus having a vacuum chamber and a sluicing device for introducing a body from outside into said chamber, said sluicing device comprising a sluice casing connected with said vacuum chamber and having a conical bore and a lateral sluice opening passing from said conical bore to the outside, said casing being arranged so as to have said bore located away from the path of the corpuscular rays, a conical sluice member revolvably disposed in said conical bore, said member having a sluice chamber disposed so as to register with said sluice opening in one position of said revolvable member and with said vacuum chamber in another position of said revolvable member, a displaceable sleeve in said sluice chamber for holding said body, and drive means engaging said sleeve for moving said body out of said sluice chamber towards said path into the operating position.

5. In a corpuscular ray apparatus for the electron-optical study of objects, having a vacuum chamber and a sluicing device for introducing an object from outside into said chamber, said sluicing device comprising a sluice casing connected with said vacuum chamber and a lateral sluice opening passing from said conical bore to the outside, said casing being arranged so as to have said bore located away from the path of the corpuscular rays, a conical sluice member revolvably disposed in said conical bore, said bore and said revolvable sluice member being arranged outside of the path of the corpuscular rays, said member having a sluice chamber disposed so as to register with said sluice opening in one position of said revolvable member and with said vacuum chamber in another position of said revolvable member, a displaceable body disposed in said sluice chamber so as to be movable in the direction towards said ray path, a cartridge-shaped object holder detachably secured to said body, and drive means arranged in said sluice member and engaging said body for displacing said body so as to move said object holder out of said sluice chamber towards said ray path into the operating position.

6. In a corpuscular ray apparatus having a vacuum chamber and a sluicing device for introducing a body from outside into said chamber, said sluicing device comprising a sluice casing connected with said vacuum chamber and having a sluice opening accessible from outside, a sluice member revolvably disposed in said casing away from the path of the corpuscular rays and having a sluice chamber disposed so as to register with said sluice opening in one position of said revolvable member and with said vacuum chamber in another position of said member, an exteriorly actuable member connected with said sluice member for revolving said sluice member, means in said sluice chamber for holding the body to be sluiced, said means being displaceable in the direction towards said ray path to move the body in said path, a drive mechanism disposed in said revolvable sluice member and engaging said means to effect its displacement, and an exteriorly actuable member connected with said mechanism, said two exteriorly actuable members being arranged coaxialy with each other and the axis of revolution of said sluice member.

7. In a corpuscular ray apparatus having a vacuum chamber and a sluicing device for introducing a body from outside into said chamber, said sluicing device comprising a sluice casing connected with said vacuum chamber and having a conical bore and a lateral sluice opening passing from said conical bore to the outside, a conical sluice member revolvably disposed in said conical bore, said member having a sluice chamber disposed so as to register with said sluice opening in one position of said revolvable member and with said vacuum chamber in another position of said revolvable member, a displaceable sleeve disposed in said sluice chamber for holding said body to be sluiced, a driving mechanism engaging said sleeve for moving said body out of said sluice chamber into the operating position, said mechanism including a driving shaft extending to the outside through a front face of said revolvable sluice member and having a sealing cone engaging said sluice member to vacuumtightly seal said sluice chamber.

8. In a corpuscular ray apparatus having a vacuum chamber and a sluicing device for introducing a body from outside into said chamber, said sluicing device comprising a sluice casing connected with said vacuum chamber and having a conical bore and a lateral sluice opening passing from said conical bore to the outside, a conical sluice member revolvably disposed in said conical bore, said member having a sluice chamber disposed so as to register with said sluice opening in one position of said revolvable member and with said vacuum chamber in another position of said revolvable member, a displaceable part disposed in said sluice chamber for holding said body to be sluiced, said part being movable in the direction towards the interior of said vacuum chamber, a driving shaft revolvably disposed in said sluice member coaxially therewith and rectangularly with respect to the direction of movement of said displaceable part, a second shaft disposed in said sluice member in parallel relation to said first shaft, and two transmission gearings coupling said two shafts and said second shaft with said displaceable part respectively.

9. In an electron microscope having a microscope portion for directing an electron beam onto an object and a magnifying microscope portion for causing the electron beam to produce an image of the object, the combination of a sluicing device arranged between said two microscope portions for introducing the object to be studied from the outside into the path of the electron beam, said sluicing device comprising a sluice casing and a revolvable sluice plug in said casing, said casing and plug being arranged outside of the path of the electron beam, said casing having a sluice opening communicating with the outside, and said plug having a cross bore registering with said sluice opening in one position of the plug and with the interior of the microscope in another position of the plug, object-holding means displaceably arranged in said bore, and exteriorly actuable drive means for moving said holding means so as to move the object out of said bore into the path of the electron beam.

10. An electron microscope comprising a microscope portion for directing an electron beam onto an object and a magnifying microscope portion for causing the electron beam to produce an image of the object, said two microscope portions being arranged in an angular position relatively to each other so as to form an angular electron-optical path, a sluicing device arranged between said two microscope portions for introducing the object to be studied from the outside, said sluicing device comprising a sluice casing and a revolvable sluice plug in said casing, said casing and plug being arranged outside of said angular path, said casing having a sluice opening communicating with the outside, and said plug having a cross bore registering with said sluice opening in one position of the plug and with the interior of the microscope in another position of the plug, and being arranged to point towards the vertex of said angular path when in said latter position, object-holding means displaceably arranged in said bore, and exteriorly actuable drive means for moving said holding means so as to move the object out of said bore into the path of the electron beam at the point of said vertex in order to reflect the beam from said first microscope portion into said magnifying microscope portion.

FRANZ WEIGEND.